Figure 1:
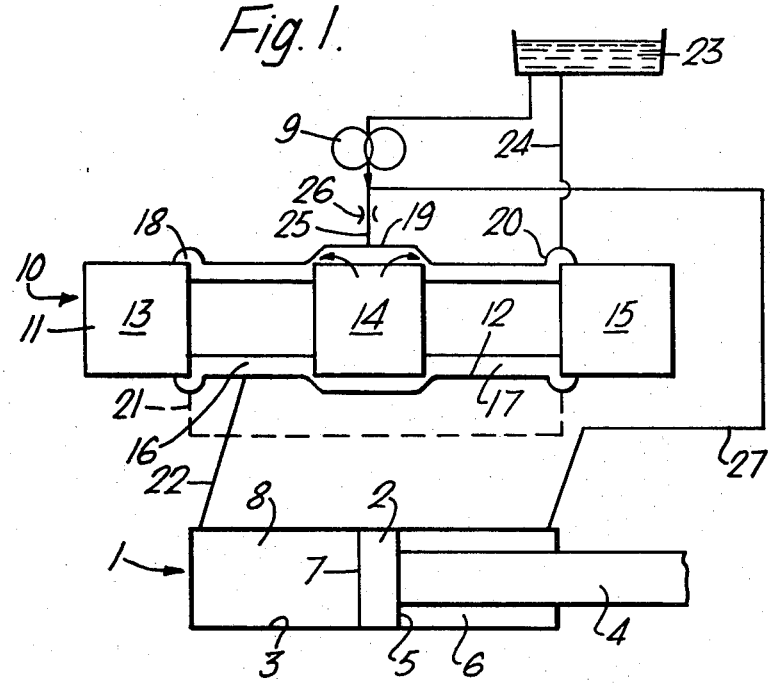

United States Patent [19]

Adams

[11] 4,365,683

[45] Dec. 28, 1982

[54] POWER ASSISTED VEHICLE STEERING SYSTEM

[75] Inventor: Frederick J. Adams, Clevedon, England

[73] Assignee: Cam Gears Limited, Hitchin, England

[21] Appl. No.: 262,954

[22] Filed: May 12, 1981

[30] Foreign Application Priority Data

May 14, 1980 [GB] United Kingdom ................ 8015929

[51] Int. Cl.³ .............................................. B62D 5/06
[52] U.S. Cl. ...................................... 180/132; 91/463;
137/625.69
[58] Field of Search ............... 180/132, 154, 155, 156,
180/157, 159, 160, 161, 163; 91/443, 463;
60/443; 137/625.69

[56] References Cited

U.S. PATENT DOCUMENTS

| | | | |
|---|---|---|---|
| 3,347,041 | 10/1967 | Bahniuk et al. | 180/159 |
| 4,144,947 | 3/1979 | Withers et al. | 180/132 |
| 4,147,179 | 4/1979 | Miura | 91/443 |
| 4,228,866 | 10/1980 | Naumann | 180/132 |

FOREIGN PATENT DOCUMENTS 2028240  3/1980  United Kingdom ................ 180/132

Primary Examiner—Joseph F. Peters, Jr.
Assistant Examiner—Donn McGiehan
Attorney, Agent, or Firm—Yount & Tarolli

[57] ABSTRACT

A power assisted vehicle steering system has a pressure biased piston and cylinder (1) actuation of which effects in the power assistance. The piston (2) has axially opposed faces (5, 7) with different effective pressurized areas of which the face (5) with the smaller area communicates with a first chamber (6) and the face (7) with the larger effective area communicates with a second chamber (8). A valve (10) which is axially adjustable (but may be rotary) in response to a steering manoeuvre controls flow of pressure fluid from the pump (9) to the piston and cylinder (1) for providing power assistance. The valve (10) derives fluid pressure from the pump (9) through a restrictor (26) (which may be adjustable) and has a neutral condition in which the first and second chambers (6, 8) and the pump output communicate with the reservoir (23) by way of control ports (18, 19, 20) in the valve, the second chamber (8) communicates with the pump by way of the restrictor (26) and the control port (19) and the first chamber (6) communicates with the pump upstream of the restrictor (26) and the control port (19). The restrictor (26) is arranged so that with the valve (10) in its neutral condition the fluid pressure in the second chamber (8) provides an axial force on the piston face (7) which balances the opposing axial force on the smaller piston face (5).

3 Claims, 5 Drawing Figures

POWER ASSISTED VEHICLE STEERING SYSTEM

DESCRIPTION

This invention relates to a power assisted vehicle steering (P.A.S.) system.

More particularly, the invention concerns such a system in which power assistance is effected by actuation of a piston and cylinder device, the piston of which has axially opposed faces which communicate respectively with a pair of piston chambers. Fluid pressure within the piston chambers is controlled by valve means which is adjustable in response to a steering manoeuvre to cause operation of the piston and cylinder device in a sense which is consistent with providing power assistance for that manoeuvre. In such a known system a fluid pressure differential piston is often employed whereby the axially opposed faces of the piston have different effective pressurised areas—these may result, for example, where the piston slidable in its cylinder has a piston rod extending from one side thereof and through which piston rod an output is derived for actuating the steering linkage to provide the required assistance. It is usual in P.A.S. systems for the valve means to have a neutral condition in which it is desirable that fluid pressure in the piston chambers effects axial forces on the opposed piston faces which maintain the piston in a balanced state and no power assistance is provided; such a balanced state is desirable, for example during straight steering. However, upon a steering manoeuvre being effected the valve is adjusted from its neutral condition to direct the flow of fluid pressure as appropriate for pressure in the piston chambers to create an imbalance of forces on the piston and power assistance to be provided in the desired direction.

To alleviate the possibility of an hydraulic lock in the piston and cylinder device and also to alleviate the requirement of an accummulator intermediate the valve means and a pump from which fluid pressure is usually derived it has hitherto been proposed for the valve means in its neutral condition to be open centre to the pump and open return to the piston chambers by which the output from the pump is controlled by the valve means to return to a reservoir (exhaust) while both piston chambers are arranged to communicate with exhaust. For such a P.A.S. system in which the opposed faces of the piston have substantially the same effective area (that is when the piston is not fluid pressure biased) a balanced state for the piston as aforementioned is usually achieved by ensuring that the valve means it its neutral condition provides the same fluid pressure in each piston chamber irrespective of the fact that those piston chambers both communicate with exhaust. It will here be appreciated that although the piston chambers communicate with exhaust they will do so through control port means in the valve means and by which control port means fluid pressure decreases are effected which can create an imbalance in the piston chambers—particularly if the piston chambers additionally communicate with the pressure source or pump and, when in the neutral condition of the valve means, the pump also communicates with exhaust.

In a P.A.S. system having a fluid pressure differential piston as aforementioned it is usual for the piston chamber which communicates with the piston face having the smaller effective area to be in constant communication with the pressure source while the piston chamber which communicates with the piston face of the larger effective area is pressurised or exhausted by control of the valve means to effect required displacement of the piston. With such an arrangement a problem occurs in ensuring that when the valve means is in its neutral condition such fluid pressures as may exist in the piston chambers are such that their reaction on the opposed faces of the piston of different effective areas maintains the piston in balance; for example with the valve means in its neutral condition if the same fluid pressure exists in both piston chambers then the piston would be subjected to a biasing force resulting in its axial movement by expansion of the piston chamber which communicates with the piston face of larger effective area. Clearly this latter effect is undesirable since the consequence would be that when steering straight the driver would have to steer in a sense which counters the biasing force on the piston irrespective of the fact that the valve means is in its neutral condition (although the problem does not exist when a steering manoeuvre is effected and the valve means is adjusted from its neutral condition since the power assistance becomes effected as required for that manoeuvre.

In an attempt to alleviate this problem and effect a balanced state for the piston when the valve means is in its neutral condition it has been proposed to have both piston chambers in communication with exhaust and also in communication with the source of fluid pressure whilst ensuring that because of pressure decreases effected in the valve means by the fluid passing through control port means, the pressure in the piston chamber which communicates with the smaller face of the piston is greater than that in the opposed piston chamber to an extent which maintains the piston in balance bearing in mind the difference in effective areas of the opposed piston faces. This balanced condition can be achieved by making the effective difference between the opposed piston face areas as little as possible and by biasing the valve means to a state in which in its neutral position the control ports provide the necessary pressure differential decreases to balance the piston—clearly this is commercially undesirable in view of the expense of adjusting each of the valve means. Alternatively the ratio between the effective areas of the piston faces can be selected so that for a particular form of valve means the pressure decreases through its control ports are such that the piston will be balanced when the valve means is in its neutral condition—this has the disadvantage that the required ratio between the opposed piston faces to provide piston balance with the valve means in its neutral condition may provide unacceptable forces on the piston when the valve means is adjusted from its neutral condition during a steering manoeuvre (by unacceptable changes being effected in the pressure differentials caused by the adjustment of the control ports).

It is an object of the present invention to provide a power assisted vehicle steering system having a pressure biased piston and cylinder device for providing power assistance in which the piston of the device has axially opposed faces with different effective pressurised areas to which fluid under pressure is controlled by valve means and in which the axial forces on the piston can be balanced when the valve means is in a neutral condition in a simple and relatively inexpensive manner which alleviates the disadvantages as above described of the prior proposals.

According to the present invention there is provided a power assisted vehicle steering system comprising a pressure biased piston and cylinder device actuation of which effects in the power assistance, the piston of said device having axially opposed faces with different effective pressurised areas of which the face with the smaller effective area communicates with a first piston chamber and the face with the larger effective area communicates with a second piston chamber; pump means having an output from which fluid under pressure is derived for actuating the piston and cylinder device; valve means which is adjustable in response to a steering manoeuvre to control flow of fluid under pressure from the pump output to the piston and cylinder device for providing power assistance consistent with said manoeuvre, said valve means deriving fluid under pressure from the pump output by way of restrictor means and having a neutral condition in which the first and second piston chambers and the pump output communicate with exhaust by way of control port means in the valve means, said second piston chamber communicates with the pump output by way of said restrictor means and said control port means, and said first piston chamber communicates with the pump output upstream of said restrictor means and said control port means, and wherein the restrictor means is arranged so that with the valve means in its neutral condition the fluid pressure in the second piston chamber having suffered a pressure decrease effected by the restrictor means and the control port means provides an axial force on the larger piston face which substantially balances an opposing axial force on the smaller piston face provided by the fluid pressure in the first piston chamber.

By the present invention the restrictor means can be selected (or may be adjustable to a condition) so that when the valve means is in its neutral condition the fluid pressure in the second piston chamber which results from the output of the pump and has suffered pressure decreases in passing through the restrictor means and control port means in the valve means applies an axial force on the piston which balances the axial force on the piston effected by fluid pressure in the first piston chamber which is derived from the pump means upstream of the restrictor means. The first piston chamber can communicate with the pump means upstream of the restrictor means directly or by way of control port means in the valve means. The valve means may be of a form which is conventional for P.A.S. systems, for example where axial or rotary displacement of a spool is effected in response to a steering manoeuvre to control fluid pressure variations in the piston and cylinder device.

Figure 3:
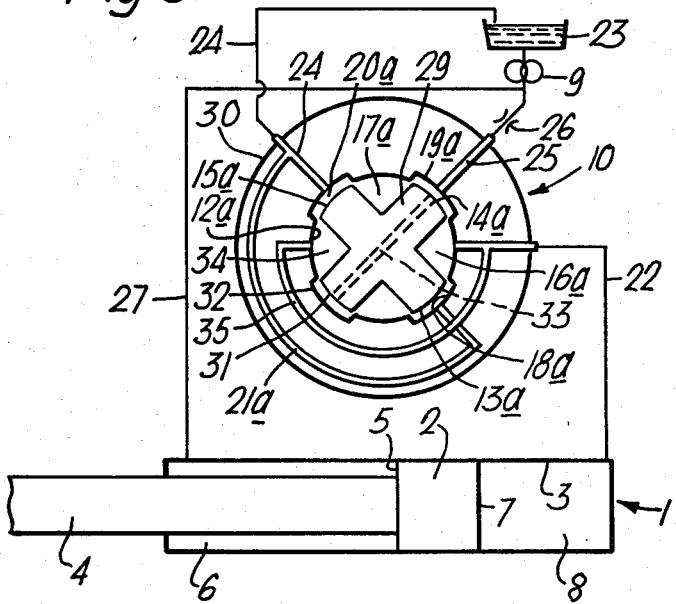
Figure 2:
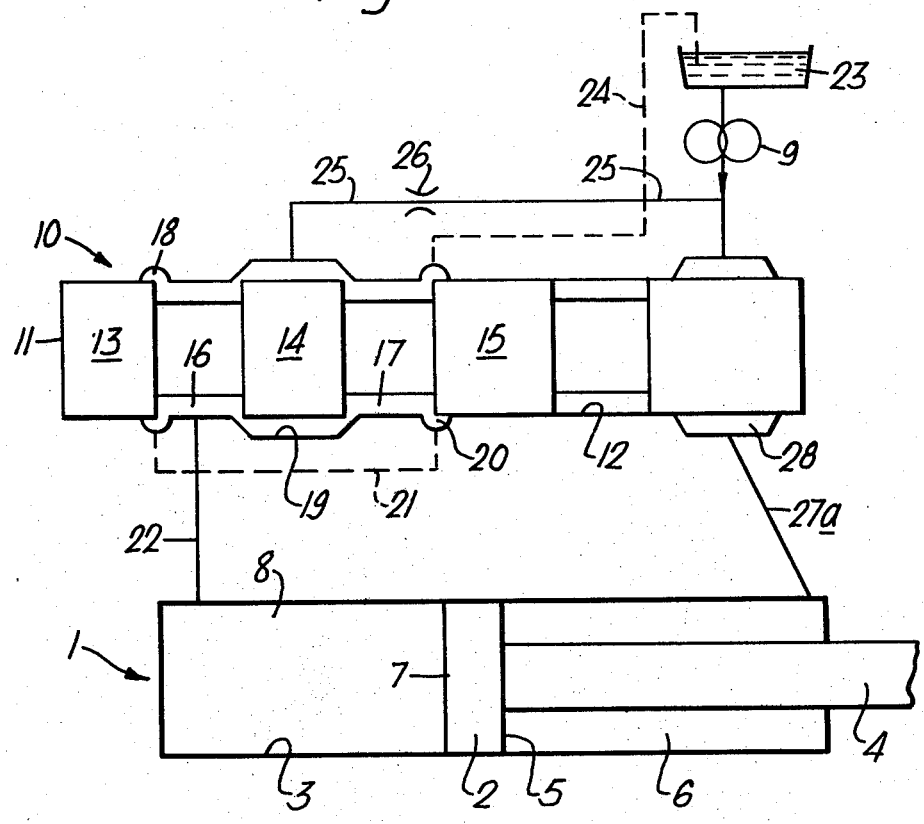
Figure 3A:
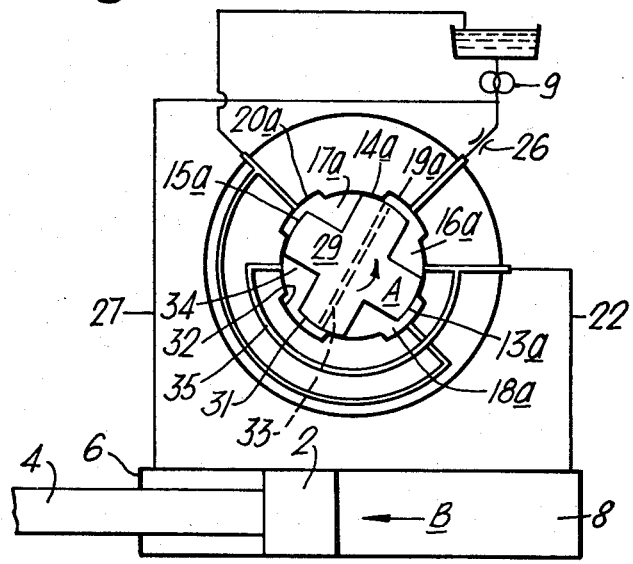
Figure 3B:
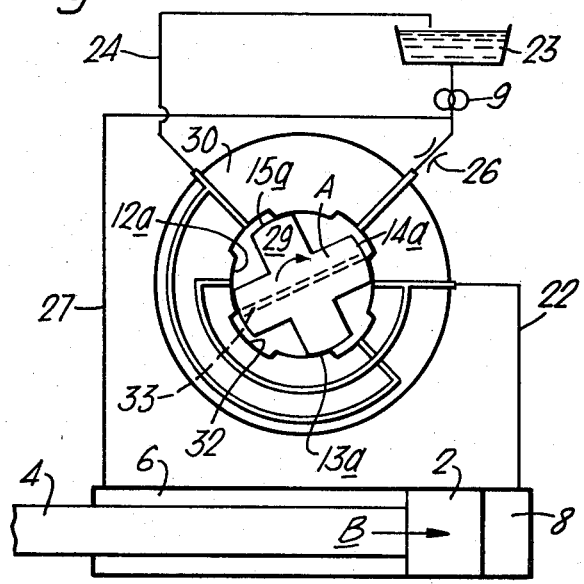

Embodiments of power assisted vehicle steering systems constructed in accordance with the present invention will now be described, by way of example only, with reference to the accompanying illustrative drawings in which:

FIG. 1 schematically illustrates a first embodiment of the system in which the valve means is axially adjustable in response to a steering manoeuver;

FIG. 2 illustrates a modification of the system shown in FIG. 1;

FIG. 3 schematically illustrates a second embodiment of the system in which the valve means is rotationally adjustable in response to a steering manoeuvre, and FIGS. 3A and 3B illustrate alternative positions of adjustment of the valve means in FIG. 3.

The power assisted vehicle steering system in FIG. 1 has a pressure biased piston and cylinder device 1 comprising a piston 2 axially slidable in a piston cylinder 3. A piston rod 4 extends from the piston 2 and from the cylinder 3 and this rod together with the piston and cylinder are incorporated in the steering linkage of a vehicle so that actuation of the device 1 effects in power assistance being provided to movement of the steering linkage during a steering manoeuvre. The piston 2 has axially opposed faces with different effective pressurised areas (caused by the presence of the piston rod 4 extending from one side of the piston) of which the face 5 with the smaller effective area communicates with a piston chamber 6 and the face 7 with the larger effective area communicates with a piston chamber 8. Fluid pressure for operation of the device 1 is derived from an engine driven pump 9 of the vehicle under control of a valve 10.

The valve 10 is incorporated in the steering system to be adjustable in response to a steering manoeuvre to control flow of fluid under pressure from the pump 9 to the device 1 for providing power assistance consistent with the steering manoeuvre. In FIG. 1 the valve 10 comprises a spool 11 which is axially displaceable in a spool cylinder 12 in response to the steering manoeuvre and has a neutral condition (in which it is illustrated) which is intended to be consistent with no power assistance being provided. More particularly, the spool 11 has axially spaced lands 13, 14 and 15 which form with the spool cylinder 12 spool chambers 16 and 17. Annular recess ports 18, 19 and 20 are provided in the spool cylinder. With the valve 10 in its neutral condition as shown, spool chamber 16 communicates with both ports 18 and 19 and spool chamber 17 communicates with both ports 19 and 20. Ports 18 and 20 are in constant communication by way of passage 21; spool chamber 16 is in constant communication with piston chamber 8 through passage 22 and port 20 is in constant communication with a fluid reservoir 23 by way of passage 24.

Fluid under pressure from the output of pump 9 is delivered to the valve 10 by way of a passage 25 which includes a restrictor 26. The piston chamber 6 is in constant communication by way of a passage 27 with the output from pump 9 and communicates with the pump output passage 25 at a position upstream of the restrictor 26.

The difference between the effective pressurised areas of piston faces 7 and 5 can be any desired ratio greater than one but is preferably, and in the present example will be considered as, 2:1 so that the area of face 5 is half that of face 7; consequently when the valve 10 is in its neutral condition which is intended to correspond with no power assistance being provided, the opposed axial forces on the piston should maintain the piston in balance and thus in the preferred arrangement the fluid pressure in piston chamber 6 should be double that in the piston chamber 8. This latter condition has to be achieved bearing in mind that in fluid valves pressure decreases or drops are experienced during fluid flow through control ports and passages in the valve; in the valve 10 pressure drops would be experienced in particular by the passage of fluid through the restricted annular passages formed between the recess 19 and spool chambers 16 and 17 and between the spool chamber 17 and recess 20. By adjustment of the restrictor 26, or selection of an appropriately sized restrictor, it is possible by the present invention to arrange for fluid pressure drops within the system and from the output of the pump 9 (which output is preferably substantially constant) so that appropriate pressures are available in the piston chambers 6 and 8 to axially balance the piston with the valve 10 in its is neutral condition. By way of example, with the valve 10 in its neutral condition it can be assumed that the pump 9 draws fluid from the reservoir 23 which is at zero p.s.i. (atmospheric pressure) and provides an output pressure in line 25 of 40 p.s.i. which pressure is then available in piston chamber 6. If it is predetermined that a pressure drop of 15 p.s.i. is effected in passing from recess 19 into spool chamber 16 or 17 then by providing the restrictor 26 with characteristics which give a pressure decrease of 5 p.s.i. it will be apparent that a pressure of 20 p.s.i. is available in the spool chamber 16 and thereby through passage 22 in the piston chamber 8 to provide an axial force on the face 7 which balances that on the face 5. In the above calculations, it is of course assumed that zero pressure drop is effected in the passages 22, 25 and 27.

It will be noted from FIG. 1 that the valve 10 is open centre to the pump in its neutral condition whereby the output of pump 9 through passage 25 communicates with the reservoir 23 by way of recess 19, spool chamber 17, port 20 and passage 24 and in so doing experiences pressure drops of 5 p.s.i. through restrictor 26, 15 p.s.i. in passing from recess 19 to chamber 17, 15 p.s.i. in passing from chamber 17 to port 20 and 5 p.s.i. in passing through passage 24. In addition, the valve 10 in its neutral condition is open return to the piston chambers whereby both piston chambers communicate with the reservoir 23 to alleviate the possibility of an hydraulic lock being formed in the device 1, piston chamber 8 communicating with the reservoir through passage 22, spool chamber 16, passage 21 and passage 24 and piston chamber 6 communicating with the reservoir through passage 27, restrictor 26, recess 19, spool chamber 17 and passage 24.

Operation of the valve 10 to provide power assistance during a steering manoeuvre will be apparent to those skilled in the art whereby displacement of the spool 11 leftwardly in the Figure and relative to the cylinder 12 causes spool land 14 to close communication between fluid pressure in the passage 25 and the spool chamber 16 and thereby with the piston chamber 8 while this latter chamber maintains its communication with the reservoir 23 by way of recess 18, passage 21, recess 20 and passage 24. In addition, port 20 is closed by spool land 15 to communication with spool chamber 17 so that the pump output is directed solely to the piston chamber 6 which, with the piston chamber 8 exhausting, causes the piston 2 to be displaced leftwardly in the Figure to assist in the steering manoeuvre. Conversely for a steering manoeuvre in the opposite sense whereby the spool 11 is displaced rightwardly in the Figure relative to its cylinder, spool land 13 closes spool chamber 16 to communication with the port 18 and thereby with the reservoir 23 so that fluid pressure is available in the piston chamber 8 while spool land 14 closes off communication between the recess 19 and spool chamber 17 and neither piston chamber 6 nor 8 communicates with the reservoir 23 but both these piston chambers communicate with the pressure output from pump 9. In this latter communication it will be noted that the fluid pressure in piston chamber 8 will have experienced a pressure drop (for example, at least 5 p.s.i. by the restrictor 26) but even so the 2:1 ratio between the pressurised areas of piston faces 7 and 5 is such that the pressure differential in piston chambers 6 and 8 will cause the piston to be displaced rightwardly in the Figure to provide the necessary power assistance to the steering manoeuvre.

From FIG. 1 it will be seen that constant communication between the piston chamber 6 and the pump output passage 25 is achieved directly through passage 27 (that is such communication is not through the valve 1). In the modification shown in FIG. 2 however, communication between the pump output line 25 and the piston chamber 6 is by way of a passage 27a which includes an annular recess port 28 in the spool cylinder 12.

In the embodiment of the system shown in FIG. 3 the valve 10 is of the rotary type having a spool 29 which is axially rotatable in a housing 30. Axial rotation of the spool 29 is effected in response to a steering manoeuvre to control fluid pressure flow in the piston and cylinder device 1 for effecting power assistance which is consistent with the steering manoeuvre. In essence the rotary valve 10 serves the same purpose as the axial valve in FIG. 1 and in FIG. 3 is shown in its neutral condition. As will be apparent in forming the rotary valve as shown in FIG. 3 the annular recesses 18, 19 and 20 in FIG. 1 are effectively replaced by axial recesses 18a, 19a and 20a in the cylinder 12a in the housing 30 within which the spool 29 is rotatable. The spool is of cruciform shape in lateral section to provide four longitudinally extending and circumferentially spaced lands three of which 13a, 14a and 15a correspond to the spool lands 13, 14 and 15 respectively in the FIG. 1 arrangement. The fourth spool land 31 operates with a fourth axial recess 32 in the cylinder 12a which recess 32 is in constant communication through internal passage 33 in the spool with recess 19a. Passage 21a within the housing 30 corresponds to passage 21 in the FIG. 1 arrangement. Formed between the spool lands 15a and 31 is spool chamber 34 which is in constant communication by way of passage 35 in the spool housing with passage 22 and thereby piston chamber 8.

The valve 10 in FIG. 3 is shown in its neutral condition where each of the four axially extending recesses in the spool cylinder 12a communicate with the four spool chambers with the effect that the piston and cylinder device is balanced in the same manner as in the FIG. 1 arrangement, and the system is open centre to the pump 9 and open return to the piston chambers 6 and 8. During a steering manoeuvre the spool 29 is rotated axially relative to the housing as indicated by the arrow A in either FIG. 3A or FIG. 3B to effect movement of the piston 2 in the directions respectively indicated by the arrows B in those Figures. The control of fluid pressure by the rotary valve 10 following its rotation will be apparent to those skilled in the art and from FIGS. 3 to 3B.

I claim:

1. A power assisted vehicle steering system comprising a pressure biased piston and cylinder device actuation of which effects in the power assistance, the piston of said device having axially opposed faces with different effective pressurised areas of which the face with the smaller effective area communicates with a first piston chamber and the face with the larger effective area communicates with a second piston chamber; pump means having an output from which fluid under pressure is derived for actuating the piston and cylinder device; valve means which is adjustable in response to a steering manoeuvre to control flow of fluid under pressure from the pump output to the piston and cylinder device for providing power assistance consistent with said manoeuvre, said valve means deriving fluid under pressure from the pump output by way of restrictor means and having a neutral condition in which the first and second piston chambers and the pump output communicate with exhaust by way of control port means in the valve means, said second piston chamber communicates with the pump output by way of said restrictor means and said control port means, and said first piston chamber communicates with the pump output upstream of said restrictor means and said control port means, and wherein the restrictor means is arranged so that with the valve means in its neutral condition the fluid pressure in the second piston chamber having suffered a pressure decrease effected by the restrictor means and the control port means provides an axial force on the larger piston face which substantially balances an opposing axial force on the smaller piston face provided by the fluid pressure in the first piston chamber.

2. A system as claimed in claim 1 in which the restrictor means (26) is adjustable.

3. A system as claimed in claim 1 in which the first piston chamber (6) communicates with the pump means (9) upstream of the restrictor means (26) by way of control port means (28) in the valve means (10).

* * * * *